United States Patent
Ikeda et al.

(10) Patent No.: US 6,752,954 B2
(45) Date of Patent: Jun. 22, 2004

(54) ROLLER PRODUCING METHOD

(75) Inventors: Kazuaki Ikeda, Sennan-gun (JP); Katsuya Yamada, Sennan-gun (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 0 days.

(21) Appl. No.: 10/297,885

(22) PCT Filed: Jun. 14, 2001

(86) PCT No.: PCT/JP01/05049

§ 371 (c)(1),
(2), (4) Date: Dec. 11, 2002

(87) PCT Pub. No.: WO01/96755

PCT Pub. Date: Dec. 20, 2001

(65) Prior Publication Data

US 2003/0132555 A1 Jul. 17, 2003

(30) Foreign Application Priority Data

Jun. 14, 2000 (JP) .......................... 2000-177693

(51) Int. Cl.[7] .......................... B29C 44/06; B29C 44/12
(52) U.S. Cl. .................. 264/485; 264/424; 264/494; 264/46.5; 264/46.6; 264/46.9
(58) Field of Search ............................... 264/424, 485, 264/494, 46.5, 46.6, 46.7, 46.9

(56) References Cited

U.S. PATENT DOCUMENTS

| | | | | | |
|---|---|---|---|---|---|
| 3,559,782 A | * | 2/1971 | Lesley et al. | ................. | 193/37 |
| 3,724,983 A | * | 4/1973 | Nelson | ..................... | 425/129.1 |
| 3,978,181 A | * | 8/1976 | Vahle | ........................ | 264/46.7 |
| 4,294,787 A | * | 10/1981 | Lo | ............................. | 264/46.6 |
| 4,413,822 A | * | 11/1983 | Fernandez et al. | .......... | 473/536 |
| 5,792,302 A | * | 8/1998 | Nakada et al. | .............. | 156/293 |
| 6,156,257 A | * | 12/2000 | Tachi et al. | ................. | 264/510 |
| 6,500,508 B2 | * | 12/2002 | Hayami et al. | ............. | 428/36.9 |
| 6,569,915 B1 | * | 5/2003 | Jackson et al. | ............. | 522/112 |
| 6,599,462 B1 | * | 7/2003 | Miraki | ....................... | 264/456 |

FOREIGN PATENT DOCUMENTS

| | | |
|---|---|---|
| JP | 50-7097 | 3/1975 |
| JP | 51-27276 | 8/1976 |
| JP | 7-126468 | 5/1995 |
| JP | 8-22209 | 1/1996 |
| JP | 8-197665 | 8/1996 |
| JP | 9-160352 | 6/1997 |

* cited by examiner

Primary Examiner—Allan Kuhns
(74) Attorney, Agent, or Firm—McDermott, Will & Emery

(57) ABSTRACT

A manufacturing method is provided for a roller, by which a roller having low eccentricity and high surface smoothness can be obtained without the need to perform cumbersome processes such as polishing of a foamed layer. The manufacturing method for a roller includes the steps of injecting a foam-layer compound into the space between a core bar, which is disposed at the center of a cylindrical mold, and an electron beam-irradiated tube, which has an outer diameter somewhat smaller than an inside diameter of the cylindrical mold, and which is set inside the cylindrical mold, and heating and foaming the foam-layer compound, so that the outer surface of the electron beam-irradiated tube is pressed against the inner surface of the cylindrical mold.

7 Claims, 2 Drawing Sheets

ROLLER PRODUCING METHOD

TECHNICAL FIELD

The present invention relates to a method for manufacturing a roller which is used in printers, copy machines, etc.

BACKGROUND ART

In printers, copy machines, etc., various types of rollers such as charging rollers, developing rollers, transfer rollers, fusing rollers, pressure rollers, etc., are used.

An explanation about a charging roller will be given below for a typical example of such rollers.

Non-contact methods utilizing corona charging, individual charging, needle electrodes, etc., and contact methods utilizing rollers, conductive brushes, etc., are charging methods used for printers and copy machines known in the art. Recently, the method utilizing rollers is most commonly used, since it has various technical advantages; for example, the method is ozone-free.

A semi-conductive roller used in this method is required to have the following features.

(1) no contamination of photosensitive drums
(2) high surface smoothness
(3) stable resistance (semiconductive area)
(4) low eccentricity
(5) low abrasion and high toner resistance
(6) high flexibility
(7) low price In order to satisfy the above-described features, a semi-conductive roller having a construction as shown in FIG. 2 has been suggested.

This semi-conductive roller has such a construction wherein a core bar is covered by three layers: layer A, which is a flexible foamed layer of EPDM, urethane, etc., and which has a resistance of 1.0 E+04 to 1.0 E+08 Ωcm; layer B, which is an elastomer layer having a resistance of 1.0 E+08 to 1.0 E+12 Ωcm; and layer C, which is a protection layer formed of a resin such as nylon, etc.

In the above-described construction, it is extremely difficult to form layers having a smooth surface and low eccentricity around the core bar. Of the three layers, it is especially difficult to form the foamed layer having a smooth surface and low eccentricity. Accordingly, a cumbersome method, as disclosed in Japanese Unexamined Patent Application Publication No. 8-22209, is applied, in which, after the foamed layer is formed, the surface thereof is smoothed by polishing and the eccentricity thereof is corrected.

DISCLOSURE OF INVENTION

An object of the present invention is to provide a method for manufacturing a roller having high surface smoothness and low eccentricity without performing cumbersome processes such as polishing a foamed layer. According to the present invention, a compound for foaming a foamed (hereinafter "foamed-layer compound") is injected into a space between a core bar, which is disposed at the center of a cylindrical mold, and an electron-beam-irradiated tube, which has an outer diameter somewhat smaller than the inside diameter of the cylindrical mold, and which is set inside the cylindrical mold. Then, the foam-layer compound is heated and foamed so that the outer surface of the electron-beam-irradiated tube is pressed against the inner surface of the cylindrical mold.

Figure 1:
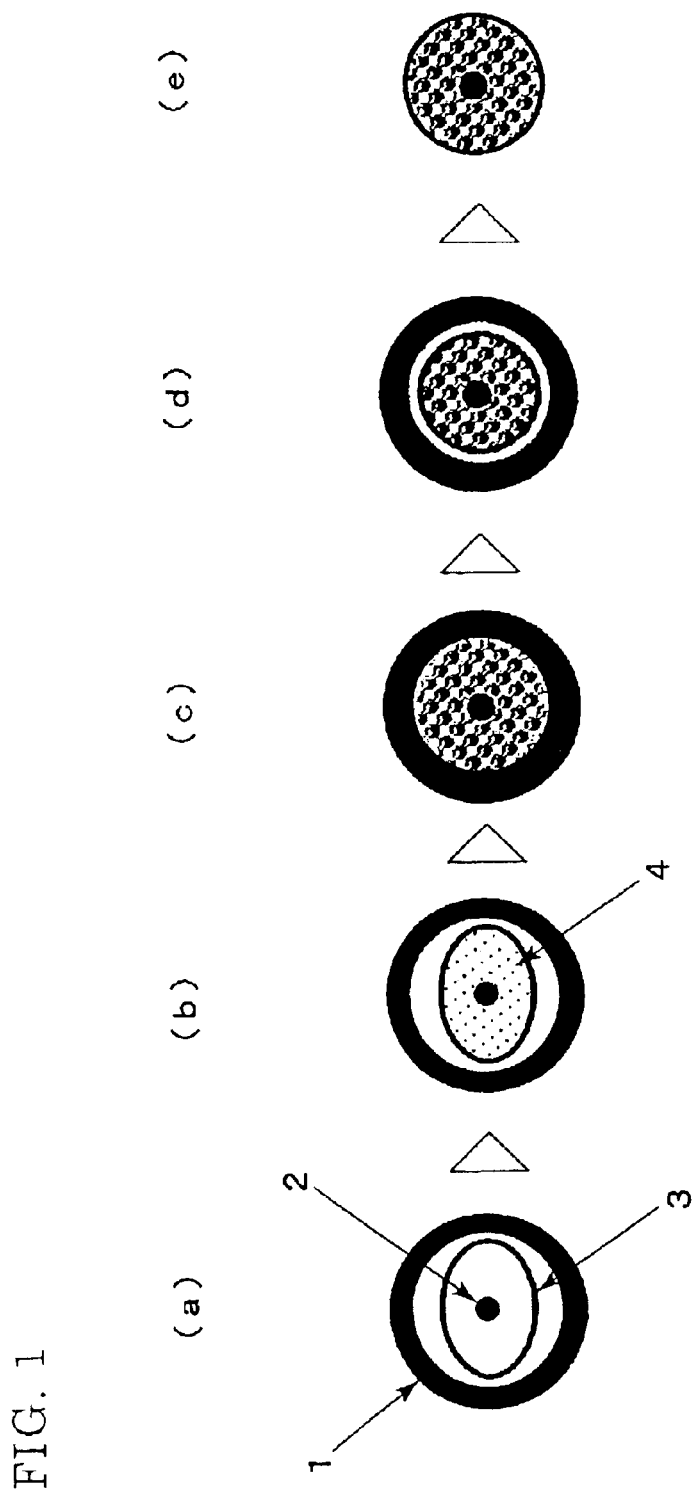
FIG. 1(a)–(e) is a schematic representation showing an example of a manufacturing process of a roller according to the present invention.
Figure 2:
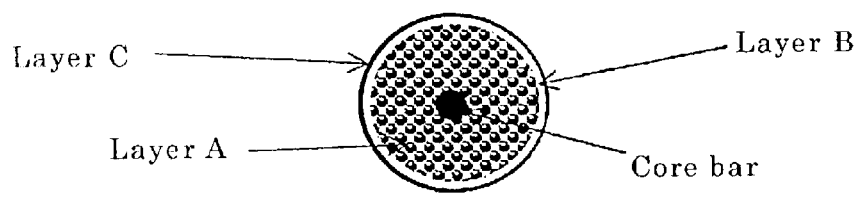
FIG. 2 is a sectional view of an example of a semi-conductive roller.

REFERENCE NUMERALS 1 metal pipe
2 core bar
3 electron-beam-irradiated tube
4 foam-layer compound

BEST MODE FOR CARRYING OUT THE INVENTION

According to the present invention, a material used for the electron-beam-irradiated tube should preferably be a flexible material, though not limited thereto, so that flexibility of the foamed layer is not degraded. The electron-beam-irradiated tube may be constructed, for example, by continuously extruding a material such as polyolefin (for example, low density polyethylene, chlorinated polyethylene, EVA, EEA, etc.), and irradiating it with an electron beam.

When charging rollers and developing rollers are used, they come into direct contact with photosensitive drums, which are extremely sensitive to peroxides and impurities. Accordingly, it is important to suppress bleed from the material of the roller as much as possible.

In order to suppress bleed, coatings or semi-conductive heat-shrinkable tubes are conventionally used. However, with respect to coatings, there is a problem in that resistance control of carbon is difficult. In addition, there also are problems of pinholes, thickness uniformity, costs, etc. With respect to heat-shrinkable tubes, there is also a problem of resistance control, which will be described below.

In contrast, the electron-beam-irradiated tube according to the present invention is able to solve the above-described problems. In addition, cross-linking agents are, of course, not used, therefore contamination of the photosensitive members is completely avoided.

In addition, unlike a method in which a protection layer is formed by applying a coating material on the foamed layer, pinholes do not occur.

There is a limit to the surface smoothness of the electron-beam-irradiated tube, when it is constructed simply by continuously extruding a material such as polyolefin, etc., and irradiating it by an electric beam. However, according to the present invention, the foam-layer compound is injected into the space between the core bar, which is disposed at the center of the cylindrical mold, and the electron-beam-irradiated tube, which has an outer diameter somewhat smaller than the inside diameter of the cylindrical mold, and is heated and foamed so that the outer surface of the electron-beam-irradiated tube, which is also heated, is pressed against the inner surface of the cylindrical mold. Accordingly, the surface smoothness of the outer surface of the tube is increased, and a roller having high surface smoothness can be obtained.

The inner surface of the cylindrical mold used in a method according to the present invention is preferably treated by a specific process.

The treatment may, for example, be fluorine coating, hard chrome plating, eutectoid plating, blended laminate coating, etc., or most preferably, mirror polishing.

When the outer surface of the electron-beam-irradiated tube, which is heated, is pressed against the mirror polished inner surface of the cylindrical mold, the surface smoothness of the electron-beam-irradiated tube becomes extremely high. Accordingly, a roller having extremely high surface smoothness can be obtained.

In addition, according to the present invention, a tube that is irradiated with an electron beam and is adequately cross-linked is used. Accordingly, in the process of heating and foaming the foam-layer compound and pressing the outer surface of the electron-beam-irradiated tube against the inner surface of the cylindrical mold, melt flow does not occur and a predetermined thickness of the tube, which is preferably in the range of 0.1 mm to 1 mm, can be maintained. In addition, a gap can be generated between the outer surface of the tube and the inner surface of the mold in the radial direction, so that the completed roller can be removed easily from the mold. However, when the electron-beam-irradiated tube is formed of a material having extremely high heat setting ability and crystallinity such as polyethylene, etc., the tube is set by heat while it is pressed against the mold, and cannot easily shrink in the radial direction in a cooling process. In addition, such a material is hard, and the completed roller cannot be removed easily from the mold. Thus, the electron-beam-irradiated tube is preferably formed of a material having relatively low crystallinity or of an amorphous material, which shrinks to some extent in the cooling process.

According to the present invention, the core bar may be disposed in the mold in advance, or may be disposed in the mold at the same time the electron-beam-irradiated tube is set. Alternatively, the core bar may also be disposed in the cylindrical mold after the electron-beam-irradiated tube is set.

In addition, according to the present invention, the foam-layer compound may be a compact, having a fixed shape such as tube, sheet, etc., or a solid having a flexible shape such as pellets, powder, etc. The foam-layer compound may also be a liquid.

The shape of the foam-layer compound before the foaming process is not restricted, provided that a predetermined amount can be injected or inserted into the space between the core bar and the electron-beam-irradiated tube and can be heated and foamed so that the volume thereof is increased and the outer surface of the electron-beam-irradiated tube is pressed against the inner surface of the mold.

In addition, according to the present invention, the base material for the foam-layer compound is not restricted, and various materials including rubbers such as EPDM, etc., urethane, silicone, polyolefin, PVC, etc., may be used. However, elastomeric materials are preferably used.

The foam-layer compound is formed by adding a blowing agent, and an organic microballoon, etc., to the above described base materials.

With respect to the blowing agent, chemical blowing agents such as ADCA, AIBN, DAB, DPT, BSH, TSH, OBSH, etc., may be used, and the blowing temperature and blowing rate may be controlled by using an inorganic base such as zinc white, tribasic lead sulphate, zinc nitrate, lead phthalate, etc., metallic soaps such as zinc stearate, etc., and acids such as oxalic acid, succinic acid, adipic acid, etc.

Instead of injecting the foam-layer compound into the space between the core bar, which is disposed at the center of the cylindrical mold, and the electron-beam-irradiated tube, which has an outer diameter slightly smaller than an inside diameter of the cylindrical mold, and which is set in the cylindrical mold, a tube-shaped inner layer may be formed beforehand in the electron-beam-irradiated tube with the foam-layer compound. Also in this case, a roller having high surface smoothness can be obtained by setting the tube having such a double layer structure in the cylindrical mold, and heating and foaming the inner layer so that the outer surface of the electron-beam-irradiated tube is pressed against the inner surface of the mold.

Accordingly, it is not necessary to inject the foam-layer compound into the space between the core bar and the electron-beam-irradiated tube each time the operation is performed. Accordingly, cross-linking by electron beam irradiation can be continuously performed at high speed.

In addition, by irradiating the foam-layer compound with an electron beam in advance, a foamed layer which is uniform and which has a high expansion ratio can be obtained in the heating and foaming process. Accordingly, when the foam-layer compound is irradiated beforehand with a predetermined amount of electron beam, and is injected into the space between the core bar and the electron-beam-irradiated tube, and is then heated and foamed, the outer surface of the electron-beam-irradiated tube is uniformly pressed against the inner surface of the mold by a large force. As a result, a roller having a higher surface smoothness can be obtained.

The cross-linking of the inner layer may be either a chemical cross-linking or a combination of a chemical cross-linking and an electron beam cross-linking.

According to the present invention, there may be a problem in that preferable degrees of cross-linking for the electron-beam-irradiated tube and the foam-layer compound, in consideration of the heating and foaming process, are lower than those necessary for satisfying the required characteristics such as permanent deformation of the obtained roller, etc. Such a problem may be solved, for example, by performing chemical cross-linking or re-irradiation after the process of heating and forming the foam-layer compound, or by increasing the cross-linking density by using a cross-linking agent having a higher decomposition temperature.

In addition, according to the present invention, the electron-beam-irradiated tube and the foam-layer compound may have semiconductivity.

The electron-beam-irradiated tube and the foam-layer compound having semiconductivity may be formed of polyolefin in which conductive fillers: more specifically, carbon, zinc oxide, or the like is added for an adequate amount.

As another method for making the electron-beam-irradiated tube and the foam-layer compound semiconductive and controlling the resistance, the addition of an ionic conductor may also be considered. In such a case, there is an advantage in that influences of processing history such as temperature variation, etc., may be reduced. However, there is also a problem in that resistivity varies due to the moisture in the air.

In contrast, in the case in which carbon, etc., is used as described above, the influence of the moisture on resistivity can be reduced; however, it is greatly influenced by processing history, especially by uniformity in the forming process and cooling rate in the processing.

For example, according to a manufacturing method having some analogy with the method of the present invention, a roller is formed by polishing extruded EDPM, etc., and covering it with a heat-shrinking, semi-conductive tube. However, in this method, non-uniform cooling inevitably occurs in the shrinking process, and variation of 3 to 4 orders in volume resistivity occurs.

In contrast, according to the present invention, an adequate amount of conductive carbon, etc., is added and is uniformly dispersed in the material, which is subjected to continuous extrusion and continuous irradiation at a constant temperature. Then, the entire body of the roller is heated in the mold having a certain thickness, and is then gradually and uniformly cooled. Accordingly, a roller in which resistance variation is extremely small can be obtained.

EXAMPLES

Rollers were experimentally manufactured by the processes described below. A cylindrical pipe formed of stainless steel having an inside diameter of 16 mm and a length of 365 mm was prepared in advance. The inner surface of the pipe was subjected to release treatment. In addition, a core bar having an outer diameter of 9 mm and jigs for setting the core bar inside the pipe, etc., were also prepared.

Processes of the manufacture of prototype rollers are described below with reference to FIG. 1.

(a) The core bar 2 is disposed at the center of the metal pipe 1, and an electron-beam-irradiated tube 3 is set inside the pipe and outside the core bar.
(b) A foam-layer compound 4 is injected into the space between the core bar and the electron-beam-irradiated tube. (c) The foam-layer compound is heated and foamed, so that the outer surface of the electron-beam-irradiated tube is pressed against the inner surface of the metal pipe and the shape of a roller is formed.
(d) The roller is cooled so that the outer diameter thereof is slightly reduced.
(d) The roller is removed.

Example 1

An electron-beam-irradiated tube was formed by the following process. First, a tube having an outer diameter of 14 mm and a thickness of 0.25 mm was formed by continuous extrusion of a material including 100 parts by weight of chlorinated polyethylene (chlorine content: 32%, residual quantity of crystal: 50 J/g), 5 parts by weight of a lead based stabilizer, and 0.2 parts by weight of a phenolic antioxidant. Then, the tube was irradiated at 10 Mrad using a 2 MeV electron beam accelerator.

Next, pellets, which served as the foam-layer compound, were formed by a material including 100 parts by weight of chlorinated polyethylene (residual quantity of crystal: 2 J/g or less, 0.1 g/10 min.@21.6 kg, relative density: 1.12), 100 parts by weight of an azodicarbonamide blowing agent (temperature at which blowing starts: 197° C., median diameter of foam particles: 11.5 μm), and 0.2 parts by weight of a phenolic antioxidant.

The core bar was disposed at the center of the pipe formed of stainless steel, and the electron-beam-irradiated tube was set inside the pipe and outside the core bar. Then, the pellets (the foam-layer compound), were injected into the space between the core bar and the electron-beam-irradiated tube.

Then, the entire body was disposed inside a constant temperature bath, and was heated for 45 minutes at 250° C.

Due to the heat applied, the pellets (the foam-layer compound) were foamed and the volume thereof was increased. Thus, the outer surface of the electron-beam-irradiated tube was pressed against the inner surface of the pipe, and the shape of a roller was formed.

Then, the roller was cooled so that the outer diameter thereof was slightly reduced, and was removed from the pipe.

The roller obtained by the above-described processes had high surface smoothness, low eccentricity, and high wear resistance and high toner resistance.

Example 2

In Example 2, a roller was manufactured by almost the same process as in Example 1, except that the pellets were formed of a material including 100 parts by weight of low density polyethylene (Melt Index (MI): 3 g/10 min., density 0.875), 10 parts by weight of an azodicarbonamide blowing agent (temperature at which forming starts: 197° C., median diameter of foam particles: 11.5 μm), and 0.2 parts by weight of a phenolic antioxidant, and were then irradiated at 6 Mrad using a 2 MeV electron beam accelerator.

Also in Example 2, a roller having low eccentricity and high wear resistance and high toner resistance was obtained. In addition, the amount of pellets used in Example 2 was less than that in Example 1, and the roller obtained in Example 2 had higher surface smoothness than the roller obtained in Example 1.

Example 3

In Example 3, an electron-beam-irradiated tube having an inner layer of the compound for foamed layer was formed by the following process. First, a tube having a double layer structure having an outer diameter of 14 mm, an outer layer thickness of 0.25 mm, and an inner layer thickness of 0.5 mm was formed by continuous extrusion. The outer layer was formed of a material including 100 parts by weight of chlorinated polyethylene (chlorine content: 32%, residual quantity of crystal: 50 J/g), 5 parts by weight of a lead based stabilizer, and 0.2 parts by weight of phenolic antioxidant. The inner layer was formed of a material including 100 parts by weight of low density polyethylene (MI: 3 g/10 min., density: 0.875), 10 parts by weight of azodicarbonamide blowing agent (temperature at which forming starts: 197° C., median diameter of foam particles: 11.5 μm), and 0.2 parts by weight of a phenolic antioxidant. The double layered tube was irradiated at 6 Mrad using a 2 MeV electron beam accelerator.

The above-described double layered tube was set inside the pipe and outside the core bar, and the entire body was disposed inside a constant temperature bath and was heated for 45 minutes at 250° C.

Due to the heat applied, the inner layer formed of the foam-layer compound was foamed and the volume thereof was increased. Thus, outer surface of the electron-beam-irradiated tube was pressed against the inner surface of the pipe, and the shape of a roller was formed.

Then, the roller was cooled so that the outer diameter thereof was slightly reduced, and was removed from the pipe.

Similar to the roller obtained in Example 2, the roller obtained by the above-described processes also had high surface smoothness, low eccentricity, low abrasion and high toner resistance.

Example 4

In Example 4, a material was prepared as the foam-layer compound, which includes 100 parts by weight of chlorinated polyethylene (chlorine content: 35%, residual quantity of crystal: 2 J/g or less), 2 parts by weight of cross-linking auxiliary agent (TAIC), 2 parts by weight of cross-linking agent (peroxide, Perbutyl P-T), 10 parts by weight of azodicarbonamide blowing agent (Cellmike CAP, temperature at which blowing starts: 150° C.), 5 parts by weight of lead based stabilizer, and 0.2 parts by weight of phenolic antioxidant. Then, a tube having an outer diameter of 13 mm and thickness of 0.6 mm was formed by the above-described material.

Then, the electron-beam-irradiated tube used in Example 1 was disposed inside the pipe and outside the core bar, and the above-described tube formed of the foam-layer compound was disposed between the electron-beam-irradiated tube and the core bar.

Then, the entire body was disposed inside a constant temperature bath, and was heated for 50 minutes at 160° C.

Due to the heat applied, the tube formed of the foam-layer compound was foamed and the volume thereof was increased. Thus, the outer surface of the electron-beam-irradiated tube was pressed against the inner surface of the pipe, and the shape of a roller was formed.

The roller was cooled so that the outer diameter thereof was slightly reduced, and was removed from the pipe.

The roller obtained by the above-described processes also had high surface smoothness, low eccentricity, low abrasion and high toner resistance.

Example 5

In Example 5, an electron-beam-irradiated tube having an inner layer of the compound for the foamed layer was formed by the following process. First, a tube having a double layer structure having an outer diameter of 14 mm, an outer layer thickness of 0.25 mm, and an inner layer thickness of 0.5 mm was formed by a continuous extrusion process. The outer layer was formed of a material including 100 parts by weight of chlorinated polyethylene (chlorine content: 32%, residual quantity of crystal: 50 J/g), 28 parts by weight of carbon black (acetylene black, particle diameter: 420 Å, DBP supply rate: 190 ml/100 g), 5 parts by weight of a lead based stabilizer, and 0.2 parts by weight of phenolic antioxidant. The inner layer was formed of a material including 100 parts by weight of low density polyethylene (MI: 3 g/10 min., density: 0.875), 35 parts by weight of carbon black (acetylene black, particle diameter: 420 Å, DBP supply rate: 190 ml/100 g), 10 parts by weight of azodicarbonamide blowing agent (temperature at which blowing starts: 197° C., median diameter of foam particles: 11.5 $\mu$m), and 0.2 parts by weight of a phenolic antioxidant. Then, the double layered tube was irradiated at 6 Mrad using a 2 MeV electron beam accelerator.

Then, the above-described double layered tube was set inside the pipe and outside the core bar, and the entire body was disposed inside a constant temperature bath and was heated for 45 minutes at 250° C.

Due to the heat applied, the inner layer formed of the foam-layer compound was foamed and the volume thereof was increased. Thus, outer surface of the electron-beam-irradiated tube was pressed against the inner surface of the pipe, and the shape of a roller was formed.

The roller was cooled so that the outer diameter thereof was slightly reduced, and was removed from the pipe.

The roller obtained by the above-described processes was a semi-conductive roller having an extremely uniform resistance in both the circumferential and longitudinal directions. The resistance variation in the roller was within the range of 0.2 orders around 1.0 E+10 $\Omega$. In addition, the roller had high surface smoothness, low eccentricity, low abrasion and high toner resistance.

INDUSTRIAL APPLICABILITY

As described above, according to the manufacturing method of the present invention, rollers having low eccentricity and high surface smoothness can be manufactured without performing cumbersome processes such as polishing of a foamed layer, etc. In addition, when the present invention is applied to manufacturing of a semi-conductive roller, a semi-conductive roller having extremely uniform resistance in both the circumferential and longitudinal directions can be obtained.

What is claimed is:

1. A method for manufacturing rollers, comprising the steps of:

injecting or inserting a foam-layer compound into the space between a core bar, which is disposed at the center of a cylindrical mold, and an electron-beam-irradiated tube, which has an outer diameter somewhat smaller than an inside diameter of the cylindrical mold, and which is set inside the cylindrical mold; and heating and foaming the foam-layer compound, so that the outer surface of the electron-beam-irradiated tube is pressed against the inner surface of the cylindrical mold.

2. A method for manufacturing rollers according to claim 1, wherein the inner surface of the cylindrical mold is mirror polished.

3. A method for manufacturing rollers according to claim 1, wherein the foam-layer compound is irradiated beforehand with an electron beam.

4. A method for manufacturing rollers, according to claim 1, wherein, instead of injecting or inserting the foam-layer compound into the space between the core bar, which is disposed at the center of a cylindrical mold, and the electron-beam-irradiated tube, which has an outer diameter somewhat smaller than the inside diameter of the cylindrical mold, and which is set in the cylindrical mold, an inner layer is formed beforehand in the electron-beam-irradiated tube with the foam-layer compound.

5. A method for manufacturing rollers according to claim 1, further comprising the step of cooling the foam-layer compound after the step of heating and foaming the foam-layer compound, so that a gap is generated between the outer surface of the electron-beam-irradiated tube and the inner surface of the cylindrical mold.

6. A method for manufacturing rollers according to claim 1, further comprising the step of re-irradiating or cross-linking the foam-layer compound after the step of heating and foaming the foam-layer compound.

7. A method for manufacturing rollers according to one of claims 1 to 6, wherein the electron-beam-irradiated tube and the foam-layer compound have semiconductivity.

* * * * *